US012599191B2

(12) United States Patent
Feix et al.

(10) Patent No.: US 12,599,191 B2
(45) Date of Patent: Apr. 14, 2026

(54) RECYCLING OF WASTE YARNS

(71) Applicant: adidas AG, Herzogenaurach (DE)

(72) Inventors: Thomas Feix, Herzogenaurach (DE); Simon Stegmueller, Thu Duc City (VN); Clemens Dyckmans, Nuremberg (DE); Korbinian Berner, Nuremberg (DE); Fionn Corcoran-Tadd, Portland, OR (US); Benjamin Alexander Thompsett, Nuremberg (DE)

(73) Assignee: adidas AG, Herzogenaurach (DE)

( * ) Notice: Subject to any disclaimer, the term of this patent is extended or adjusted under 35 U.S.C. 154(b) by 20 days.

(21) Appl. No.: 18/392,658

(22) Filed: Dec. 21, 2023

(65) Prior Publication Data

US 2025/0204632 A1      Jun. 26, 2025

(51) Int. Cl.
| | |
|---|---|
| *B29B 17/02* | (2006.01) |
| *A43B 1/00* | (2006.01) |
| *A43B 1/028* | (2022.01) |
| *B09B 3/20* | (2022.01) |
| *B29B 17/00* | (2006.01) |
| *B29D 35/12* | (2010.01) |
| *D02J 1/04* | (2006.01) |
| *D04H 1/736* | (2012.01) |
| *A43B 13/42* | (2006.01) |
| *A43B 23/02* | (2006.01) |

(52) U.S. Cl.
CPC ............ *A43B 1/0063* (2013.01); *A43B 1/028* (2022.01); *B09B 3/20* (2022.01); *B29B 17/0042* (2013.01); *B29B 17/02* (2013.01); *B29D 35/126* (2013.01); *D04H 1/736*

(2013.01); *A43B 13/42* (2013.01); *A43B 23/0215* (2013.01); *B29B 2017/0203* (2013.01); *D02J 1/04* (2013.01); *D10B 2501/043* (2013.01)

(58) Field of Classification Search
CPC ........ B29C 70/14; B29C 70/543; D04H 1/732
See application file for complete search history.

(56) References Cited

U.S. PATENT DOCUMENTS

| | | | |
|---|---|---|---|
| 3,644,078 A | * | 2/1972 | Tachibana ................ A24D 3/02 |
| | | | 425/197 |
| 9,185,947 B2 | | 11/2015 | Spencer et al. |
| 10,874,172 B2 | | 12/2020 | Corcoran-Tadd et al. |
| 11,602,196 B2 | | 3/2023 | Corcoran-Tadd et al. |
| 2007/0017255 A1 | | 1/2007 | Grove-Nielsen |
| 2012/0052760 A1 | | 3/2012 | Doyle et al. |

(Continued)

FOREIGN PATENT DOCUMENTS

| | | | |
|---|---|---|---|
| CN | 116787818 A | * | 9/2023 |
| JP | 2004-100066 | | 4/2004 |

(Continued)

OTHER PUBLICATIONS

Translation of CN-116787818-A (Year: 2023).*

*Primary Examiner* — John J DeRusso
(74) *Attorney, Agent, or Firm* — Sterne, Kessler, Goldstein & Fox P.L.L.C.

(57) ABSTRACT

Methods of manufacturing a component at least partially from waste yarns. In some embodiments, the waste yarns may be distributed on a surface and bonded to each other on the surface. The component may be least a part of an upper for an article of footwear, an article of apparel, or a sports equipment article.

24 Claims, 15 Drawing Sheets

(56) References Cited

U.S. PATENT DOCUMENTS

| 2012/0233883 | A1* | 9/2012 | Spencer ................. B29B 17/04 |
| | | | 264/37.3 |
| 2018/0094763 | A1 | 4/2018 | Ragiel |
| 2020/0305540 | A1 | 10/2020 | Castro Ramos |
| 2023/0284727 | A1 | 9/2023 | Borgogna |
| 2024/0208113 | A1 | 6/2024 | Ventenat et al. |

FOREIGN PATENT DOCUMENTS

| KR | 20230162845 | A | 11/2023 |
| WO | WO-2010063709 | A1 | 6/2010 |
| WO | WO-2023001602 | A1 | 1/2023 |

* cited by examiner

603

660

670

620    630

RECYCLING OF WASTE YARNS

TECHNICAL FIELD

The present disclosure relates a method of manufacturing a component at least partially from waste yarns and a corresponding component.

TECHNICAL BACKGROUND

A variety of products are at least partially formed from textile elements. For example, articles of apparel, such as sports apparel but also shirts, pants, jackets, footwear or others are often formed from various textile elements. During the process of manufacturing a textile element, scrap is generated, which usually comprises edge or cut out portions of a finished or intermediate textile element or cut ends from yarns. While textile manufacturers are optimizing these processes to reduce scrap generation in general, at least so far, it cannot be entirely avoided. Thus, recycling of scrap plays an important role in the textile industry.

However, recycling processes known in the art generally require an energy intensive process that transforms the scrap material into a source material for another product of mostly lower quality. Thus, a continuing need exists for innovations in the recycling of scrap generated when manufacturing textile elements.

BRIEF SUMMARY

The present disclosure provides methods of manufacturing a component at least partially from waste yarns. The method may comprise collecting waste yarns from prior manufacturing processes and recycling them in a method that comprises bonding the waste yarns to each other. The waste yarns may be collected, sorted, and distributed on a surface for bonding. In some cases, the surface may comprise the surface of a textile element to which the waste yarns are bonded.

A first embodiment (I) of the present disclosure is directed to method of manufacturing a component (360, 500, 501, 600, 700, 701, 702) at least partially from waste yarns (110, 120, 210, 220, 310, 320, 410, 520, 620, 810), wherein the method comprises: (a) providing (910) waste yarns; (b) distributing (920) the waste yarns on a first surface (230, 330, 530, 630, 830); and (c) bonding (930) at least a part of the distributed waste yarns to each other.

In a second embodiment (II), the waste yarns according to the first embodiment (I) comprise at least a thermoplastic polymer material.

In a third embodiment (III), at least 70%, preferably at least 80%, more preferably at least 90% and most preferably more than 95% of the waste yarns according to the first embodiment (I) or the second embodiment (II) comprise unconsolidated waste yarns.

In a fourth embodiment (IV), the waste yarns according to any one of embodiments (I)-(III) comprise consolidated waste yarns.

In a fifth embodiment (V), the bonding according to any one of embodiments (I) (IV) comprises applying heat and pressure to the distributed waste yarns.

In a sixth embodiment (VI), the waste yarns according to any one of embodiments (I)-(V) comprise leftover yarns.

In a seventh embodiment (VII), the method according to any one of embodiments (I)-(VI) further comprises separating the waste yarns from a textile element prior to providing the waste yarns.

In an eighth embodiment (VIII), the textile element according to the seventh embodiment (VII) was manufactured by winding a thread or yarn around a plurality of anchor points.

In a ninth embodiment (IX), the method according to any one of embodiments (I)-(VIII) further comprises mechanically sorting the waste yarns by length, denier, or density, and/or shortening a length of the waste yarns, prior to distributing the waste yarns on the first surface.

In a tenth embodiment (X), the method according to any one of embodiments (I)-(IX) further comprises arranging the waste yarns on a movable second surface (350, 430, 450, 850) having a plurality of openings (433, 833), wherein the distributing further comprises moving the movable surface above the first surface such that the waste yarns pass through the openings onto the first surface.

In an eleventh embodiment (XI), the second surface according to the tenth embodiment (X) is attached to a device (890) and the method further comprises controlling a movement pattern of the device based on at least one actuator.

In a twelfth embodiment (XII), the distributing according to any one of embodiments (I)-(XI) comprises distributing the waste yarns evenly on the first surface.

In a thirteenth embodiment (XIII), the distributing according to any one of embodiments (I)-(XI) comprises distributing the waste yarns on a first area of the first surface such that a first density of the distributed waste yarns is generated in the first area and distributing the waste yarns on a second area of the first surface such that a second density of the distributed waste yarns is generated in the second area, wherein the second density is smaller than the first density.

In a fourteenth embodiment (XIV), the bonding according to any one of embodiments (I)-(XIII) comprises creating a sheet material (221, 321).

In a fifteenth embodiment (XV), the method according to the fourteenth embodiment (XIV) further comprises cutting at least a portion of the sheet material into a shape of the component.

In a sixteenth embodiment (XVI), the component according to the fifteenth embodiment (XV) is at least a part of one of: an upper (360, 560) for an article of footwear, an article of apparel, or a sports equipment article.

In a seventeenth embodiment (XVII), the first surface according to any one of embodiments (I)-(XVI) comprises a first textile element (530, 630).

In an eighteenth embodiment (XVIII), the first textile element according to the seventeenth embodiment (XVII) comprises at least one layer of yarns arranged in a pattern.

In a nineteenth embodiment (XIX), the method according to the seventeenth embodiment (XVII) or the eighteenth embodiment (XVIII) further comprises arranging at least a second textile element (534, 634) on the distributed waste yarn prior to the bonding.

In a twentieth embodiment (XX), the second textile element according to the nineteenth embodiment (XIX) comprises at least one layer of yarns arranged in a pattern.

In a twenty-first embodiment (XXI), the first surface according to any one of embodiments (I)-(IX) is a part of a mold.

In a twenty-second embodiment (XXII), the bonding according to the twenty-first embodiment (XXI) comprises molding the waste yarns in the mold to form the component.

In a twenty-third embodiment (XXIII), the component according to any one of embodiments (I)-(XV) or (XVII)-(XXII) is at least a part of an article of footwear, in particular a heel counter, an insole board, a stiffening element (700, 701, 702), a midfoot component, or an outsole component.

In a twenty-fourth embodiment (XXIV), the component according to any one of embodiments (I)-(XXIII) consists of at least 50% by weight, preferably at least 70% by weight, more preferably at least 90% by weight and most preferably entirely of waste yarns.

A twenty-fifth embodiment (XXV) of the present disclosure is directed to a component (360, 500, 501, 600, 700, 701, 702) manufactured according to a method of one of embodiments (I)-(XXIV).

BRIEF DESCRIPTION OF THE FIGURES

Possible embodiments of the present disclosure will be further described in the following detailed description with reference to the following Figures. Together with the description, the Figures further serve to explain the principles of and to enable a person skilled in the relevant art(s) to make and use the disclosed embodiments. These Figures are intended to be illustrative, not limiting. Although the disclosure is generally described in the context of these embodiments, it should be understood that it is not intended to limit the scope of the disclosure to these particular embodiments. In the Figures, like reference numbers indicate identical or functionally similar elements.

DETAILED DESCRIPTION

Figure 1A:
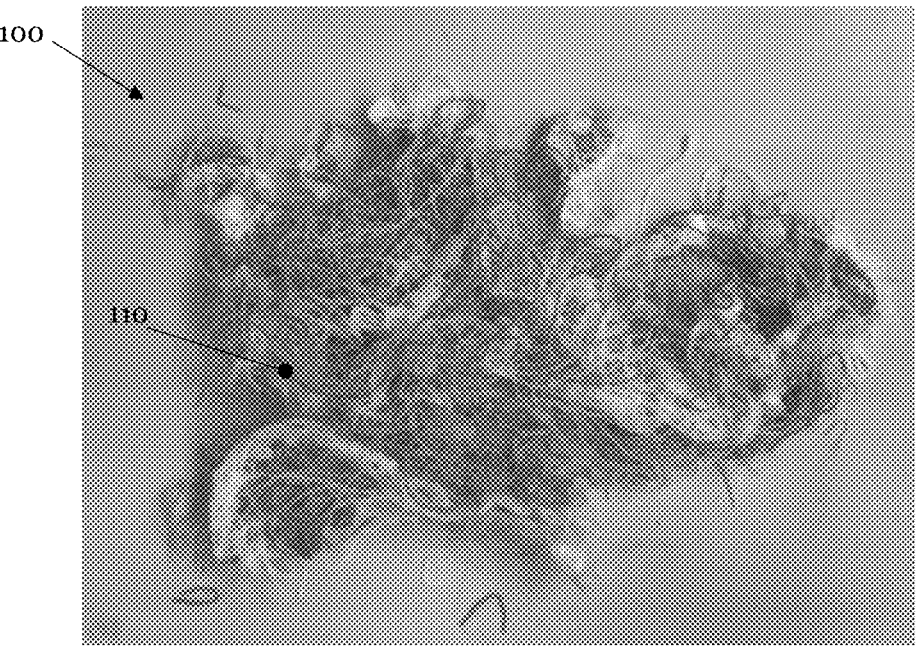
FIGS. 1A-1B show an illustration of an embodiment of waste yarns.

The indefinite articles "a," "an," and "the" include plural referents unless clearly contradicted or the context clearly dictates otherwise.

The term "comprising" is an open-ended transitional phrase. A list of elements following the transitional phrase "comprising" is a non-exclusive list, such that elements in addition to those specifically recited in the list can also be present. The phrase "consisting essentially of" limits the composition of a component to the specified materials and those that do not materially affect the basic and novel characteristic(s) of the component. The phrase "consisting of" limits the composition of a component to the specified materials and excludes any material not specified.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Methods according to embodiments of the present disclosure are designed to improve known recycling methods of scrap and to provide a textile component including scrap so that the above outlined disadvantages of the prior art are at least partly overcome. These problems or disadvantages may be solved by methods described herein, and in particular by the subject matter of the independent claims. Exemplary embodiments of the present disclosure are described herein. At least some of the exemplary embodiments are defined in the dependent claims.

The present disclosure provides a method of manufacturing a component at least partially from waste yarns. The method may comprise the steps of providing waste yarns, distributing the waste yarns on a first surface, and bonding at least a part of the distributed waste yarns to each other.

In this manner, and as described herein, the present disclosure provides a method in which the waste yarns are incorporated into a new component without requiring a labor intense and high-cost process preparing the waste yarns for further utilization.

The waste yarns may comprise at least a thermoplastic polymer material. As generally known, thermoplastic polymer materials become pliable or moldable at a material specific temperature, known as the glass-transition temperature, and solidify upon cooling. This process may be repeated. Thus, a shape of a thermoplastic polymer material may be adapted. Thermoplastic polymer materials differ from thermosetting polymer materials, which form irreversible chemical bonds during a curing process, which also occurs at a material specific temperature. Once hardened, a thermosetting polymer material does not become pliable after being heated again.

In addition to waste yarns comprising the at least one thermoplastic polymer material, the waste yarns may further comprise up to 40% by weight yarns made of thermoset polymer material. In some preferred embodiments, the waste yarns may comprise up to 25% by weight of thermoset polymer material. In some preferred embodiments, the waste yarns may comprise up to 10% by weight yarns made of thermoset polymer material. If both waste yarns comprising at least one thermoplastic polymer material and waste yarns made from thermoset polymer materials are combined, the thermoplastic polymer material of the waste yarns comprising the at least one thermoplastic polymer material may be utilized to bond themselves but also the waste yarns made from the thermoset polymer materials together. Such an embodiment enables recycling of materials such as aramid, for example.

In some embodiments, at least 70%, of the waste yarns may comprise unconsolidated waste yarns. In some preferred embodiments, at least 80% of the waste yarns may comprise unconsolidated waste yarns. In some preferred embodiments, at least 90% of the waste yarns may comprise unconsolidated waste yarns. In some preferred embodiments, at least 95% of the waste yarns may comprise unconsolidated waste yarns. In some preferred embodiments, 100% of the waste yarns may be unconsolidated waste yarns. The term "unconsolidated" as used herein generally refers to loose waste yarns, which are not mechanically connected and/or not bonded together. For example, yarn endings removed from a bobbin or a textile may comprise unconsolidated waste yarns. Based on the high percentage of unconsolidated waste yarns, the distributing of the waste yarns may be more accurate or generally improved compared to waste yarns having a lower percentage of unconsolidated waste yarns.

Additionally or alternatively, the waste yarns may comprise consolidated waste yarns. The term "consolidated" as used herein generally refers to yarns, which are joined together and/or are not in a loose yarn state. For example, consolidated waste yarns may comprise mechanically connected and/or bonded textile pieces, which may have been generated during a previous manufacturing process of a textile element. In particular, consolidated defect components can be utilized as well as pattern cut wastes. Mechanically connected pieces, for example, may comprise knitted or woven textile pieces. Bonded pieces may comprise pieces with yarns being bonded together. The pieces may correspond to regions cut or separated from a textile element. Moreover, the pieces may also correspond to entire textile elements, which may not be sold or used. The pieces may be cut or chopped into smaller pieces prior to distributing them on a first surface in accordance with the present disclosure.

The bonding may comprise applying heat and pressure to the distributed waste yarns. By heating the waste yarns, the material may be softened or partially melted such that through the application of pressure, the yarns can be bonded together. In this manner, no additional glue, resin, or adhesive may be required for bonding the waste yarns together. In these embodiments, the first surface may be a surface of a heat press or a non-sticky foil adapted for being placed inside a heat press. Thus, the waste yarns may be directly arranged on a surface adapted to be placed inside a heat press.

The waste yarns may comprise leftover yarns. Leftover yarns as used herein are portions of yarns, which are too short to be used in the manufacture of a new textile element. Leftover yarns may correspond to the remaining portion of a yarn left on a bobbin after manufacturing a textile element or to a yarn of a new bobbin, for which no use case is foreseen, for example. If a textile element has been manufactured by winding a thread or yarn around a plurality of anchor points, leftover yarns may also be cut threads of such a process, in particular a waste product from separating the textile element and a frame on which the anchor points are arranged. Additionally, waste yarns may come from cutting a pattern fitted shape of the finished textile element.

The method may further comprise the step of separating the waste yarns from a textile element prior to providing the waste yarns. The textile element may have been manufactured by winding a thread or yarn around a plurality of anchor points. Additionally or alternatively to leftover yarns, waste yarns may comprise cut endings or edge regions from a textile element. For example, in recent years, a new technique has been developed within the textile industry in which a textile element is manufactured by winding one or more threads or yarns around predefined anchor points. After winding of a desired pattern, the central portion of the wound pattern is generally consolidated, while at edge regions unconsolidated yarns remain wound around the anchor points. These unconsolidated yarns may be separated, for example cut, from the consolidated pattern. The separated portions of yarns may be waste yarns in accordance with the present disclosure.

Textile elements manufactured by winding a thread or yarn around a plurality of anchor points may be manufactured by any of the methods described in U.S. Pat. No. 10,874,172 or U.S. Pat. No. 11,602,196, both of which are hereby incorporated by reference in their entirety.

The method may further comprise the step of mechanically sorting the waste yarns by length, denier, or density and/or the step of shortening a length of the waste yarns, wherein both steps may be prior to distributing the waste yarns on the first surface. The shortening may include, e.g., a mechanical shredding of textile elements from which the waste yarns are coming from. This ensures a consistent length of the waste yarns. By this, an even distribution, a high quality and production effectivity can be achieved. Since the waste yarns may comprise yarns of various lengths, denier, and densities, each of the sorting and the shortening of the waste yarns may result in a more homogenous length, denier, or density distribution of the waste yarns. By this, the manufacturing method according to the present disclosure may provide a component of high quality and/or repeatable quality. Further, each of the yarn length, denier, or density may further affect at least one physical property of the component according to the present disclosure. Examples for physical properties may be stretch, drape, durability, abrasion resistance and others.

The method may further comprise the step of arranging the waste yarns on a movable second surface having a plurality of openings. Additionally, the step of distributing may further comprise a step of moving the movable surface above the first surface such that the waste yarns pass through the openings onto the first surface. In this manner, the second surface and/or a shape of the plurality of openings may be specifically optimized for a type of available waste yarns. The type of waste yarns may comprise one or more of a thickness of the waste yarns, a length of the waste yarns, a hardness of the waste yarns, a material composition of the waste yarns, bending properties of the waste yarns, etc. The shape of the plurality of openings may be cut into the second surface via a laser, CNC milling, waterjet cutting, plasma cutting, 3D printing, or generated by other known techniques. This may provide a high precise shape of the plurality of openings. However, alternative cutting means like knives or scissors are also applicable. The second surface may be a portion of a box, in which the waste yarns may be arranged. The step of moving may further comprise a shaking of the box.

The process of moving the movable surface such that the waste yarns pass through the openings may be utilized as one embodiment of mechanically sorting the waste yarns. For example, depending on the shape of the openings, merely waste yarns up to a specific diameter may fit through. Thus, the openings may define an upper diameter of the waste yarns after performing the sorting process. Additionally or alternatively, a sorting of waste yarns based on their density may be performed by arranging the waste yarns in a liquid. Waste yarns having a higher density compared to the liquid will sink. Waste yarns having a lower density compared to the liquid will float. It may be noted that the various sorting processes may also be combined for resulting in an even increased homogeneity of the sorted waste yarns.

The second surface may be attached to a device and the method may further comprise the step of controlling a movement pattern of the device and/or the second surface based on at least one actuator. An actuator may advantageously result in a precise movement pattern, which may be preprogrammed. For example, the device may comprise a robotic arm and/or a Computerized Numerical Control, CNC, device.

The distributing may comprise distributing the waste yarns evenly on the first surface. An even distribution of the waste yarns may result in a sheet of essentially constant thickness after the bonding. The term "essentially" is to be understood herein as including small deviations from a constant thickness based on manufacturing inaccuracies. These small deviations may be in the order of up to 5%.

Alternatively, the distributing may comprise distributing the waste yarns on a first area of the first surface such that a first density of the distributed waste yarns may be generated in the first area and distributing the waste yarns on a second area of the first surface such that a second density of the distributed waste yarns may be generated in the second area, wherein the second density may be smaller than the first density. In this manner, a map of varying densities across the first surface may be generated comprising the first and the second density or comprising a plurality of more than two distinct densities across the first surface. The second density may be zero. By this, areas with no distributed waste yarns may be generated. The distributing of waste yarns in various densities of the distributed waste yarns may be controlled by a movement pattern of the device, to which the second surface may be attached. For example, it may be controlled by a robotic arm, a CNC device or an actuator.

The bonding may comprise creating a sheet material. A sheet material may provide a source material for new components. If the volume of waste yarns is sufficiently high, the process of manufacturing the sheet material may be a continuous process. In the continuous process, the sheet material may be rolled on a role and stored or directly processed into the component. In these embodiments, the method may further comprise the step of cutting at least a portion of the sheet material into a shape of the component. The component may be at least a part of one of: an upper for an article of footwear, an article of apparel, or a sports equipment article. In this manner, the waste yarns may be reused as a component of a new product without a labor intense and energy intense pre-recycling process.

The first surface may comprise a first textile element. By this, the waste yarns may be directly attached to the first textile element after the bonding. For example, the waste yarns may be arranged on a specific area of the first textile element for providing a reinforcement and/or cushioning element. For example, if the first textile element corresponds to an upper for an article of footwear, the specific area may comprise a toe region or a heel counter region in the final article of footwear. However, other areas of textiles known in the art as including reinforcement and/or cushioning characteristics are also applicable, such as elbow regions of a piece of apparel etc.

The first textile element may comprise at least one layer of yarns arranged in a pattern. A layer arranged in a pattern may comprise a knit layer, a woven layer or a layer manufactured by winding one or more threads or yarns around predefined anchor points. By this, any waste yarn generated by manufacturing the textile element during the knitting, weaving or winding may be reused in combination with the same or other textile elements. Thus, these embodiments of the present disclosure may result in a textile component, which generated zero waste yarns during its production.

The method may further comprise the step of arranging at least a second textile element on the distributed waste yarn prior to the bonding. The first and second textile elements may provide a frame or sandwiched structure for the waste yarns. By this, first and second textile elements may both be attached to each other after the bonding based on the waste yarns arranged in between both layers. Further, the waste yarns may be distributed on opposite surfaces of the first textile element. By this, the first textile may be sandwiched by the waste yarns. In this embodiment, there is no need for a second textile element to achieve a three-layer configuration with a particular high content of waste yarns. Additionally, waste yarns may be arranged onto a surface of the first textile element. This surface may be an outer surface or an inner surface of an article of footwear or apparel. In other words, the sandwich structure may be inverted such that a textile element is arranged between two layers of distributed waste yarns. For that, a first layer of waste yarns may be distributed on a first surface, which may be for example a surface adapted to be placed in a heat press. The textile element my then be arranged on the first layer of distributed waste yarns. Then, a second layer of waste yarns may be distributed on the textile element.

The second textile element may comprise at least one layer of yarns arranged in a pattern. By arranging waste yarns in between two textile elements comprising yarns arranged in a pattern, a thickness of the resulting component may be efficiently increased. In particular, the process of winding a thread or yarn in a pattern around anchor points may require multiple repetitions for resulting in a sufficient thickness of the thus manufactured textile element. Thus, arranging waste yarns in between two textile elements, wherein each textile element comprises at least one layer of yarns wound around anchor points, may be particularly advantageous for resulting in a sufficient thickness in a time efficient manner.

The first surface may be part of a mold. Therefore, instead of arranging the waste yarns on a surface of a heat press or a textile element, the waste yarns may be directly arranged inside a mold.

The bonding may comprise molding the waste yarns in the mold to form the component. By this, structural elements may be efficiently manufactured based on waste yarns. Depending on the mold, flat components having an essentially constant thickness or structured components with varying thickness may be provided.

The component may be at least a part of an article of footwear. In an embodiment, the component may be an internal heel counter. An internal heel counter may provide support at the heel of a wearer without being visible in the final product. Thus, independent of a color composition of available waste yarns, an internal heal counter provides a sustainable solution of reducing waste yarns. In another embodiment, the component may be an external heel counter or an outsole component. In another embodiment, the component may be an insole board. The insole board may provide an advantageous pressure distribution, which may be particularly relevant for articles of footwear having cleats. In a further embodiment, the component may be a stiffening element for a midsole or a midfoot component.

These embodiments of the component may provide a beneficial increase in bending stiffness. Still in a further embodiment, waste yarns could server as cushioning elements. In particular, the waste yarns may be sandwiched by an outer fabric (e.g., a fabric of an upper exposed to the outside of an article of footwear) and an inner fabric (e.g., an inner lining of an upper).

The component may comprise at least 50% by weight of waste yarns. In some preferred embodiments, the component may comprise at least 70% by weight of waste yarns. In some preferred embodiments, the component may comprise at least 90% by weight of waste yarns. In some preferred embodiments, the component may consist entirely of waste yarns. By this, the present disclosure provides an environmentally friendly method of manufacturing a component. First, the component may consist entirely of or comprise at least to a majority by weight of waste, namely waste yarns, which were generated during the manufacture of a different product. Second, at least if the component entirely consists of waste yarns, no additional glue, adhesive or resin is required for manufacturing the component in accordance with the present disclosure.

In a further aspect, the present disclosure provides a component manufactured according to one of the above-described methods.

The various advantages, embodiments and functions of the present disclosure, as discussed above with regard to a method of manufacturing a component, also apply analogously to embodiments of the component and are not repeated here for reasons of brevity.

In the following, exemplary embodiments of the present disclosure are described in more detail, with reference to a method of manufacturing a component at least partially from waste yarns. While specific feature combinations are described in the following with respect to the exemplary embodiments of the present disclosure, it is to be understood that the disclosure is not limited to such embodiments. In particular, not all features have to be present for realizing the disclosure, and the embodiments may be modified by combining certain features of one embodiment with one or more features of another embodiment.

FIG. 1A depicts an embodiment 100 of waste yarns 110. Waste yarns 110 may be generated during a process of manufacturing a textile element. For example, waste yarns 110 may correspond to former edge regions or cut out areas from the textile element. The waste yarns 110 may comprise leftover yarns, which may correspond to yarns remained on a bobbin after manufacturing a textile. Leftover yarns are generally too short to be used for the manufacture of a further textile and were usually thrown on a landfill or recycled in an energy intense process.

Figure 1B:
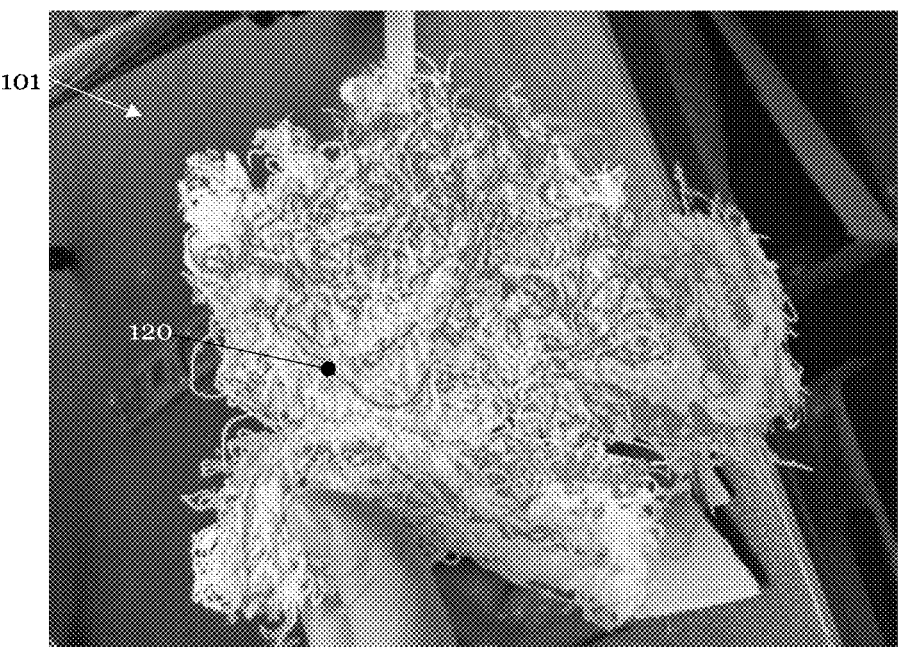

Waste yarns 110 comprise an unconsolidated thermoplastic polymer material, which may at least form part of a sheath of waste yarns 110. Thus, at least the sheath portion of waste yarns 110 may be softened or melted if exposed to heat. If the heated waste yarns 110 are further exposed to pressure, waste yarns 110 are bonded together after being cooled down to ambient temperature. The result of such a bonding process is shown in FIG. 1B, which depicts bonded waste yarns 120. Waste yarns 110 of FIG. 1A correspond to bonded waste yarns 120 after a heat-pressing process.

Figures 2A, 2B:
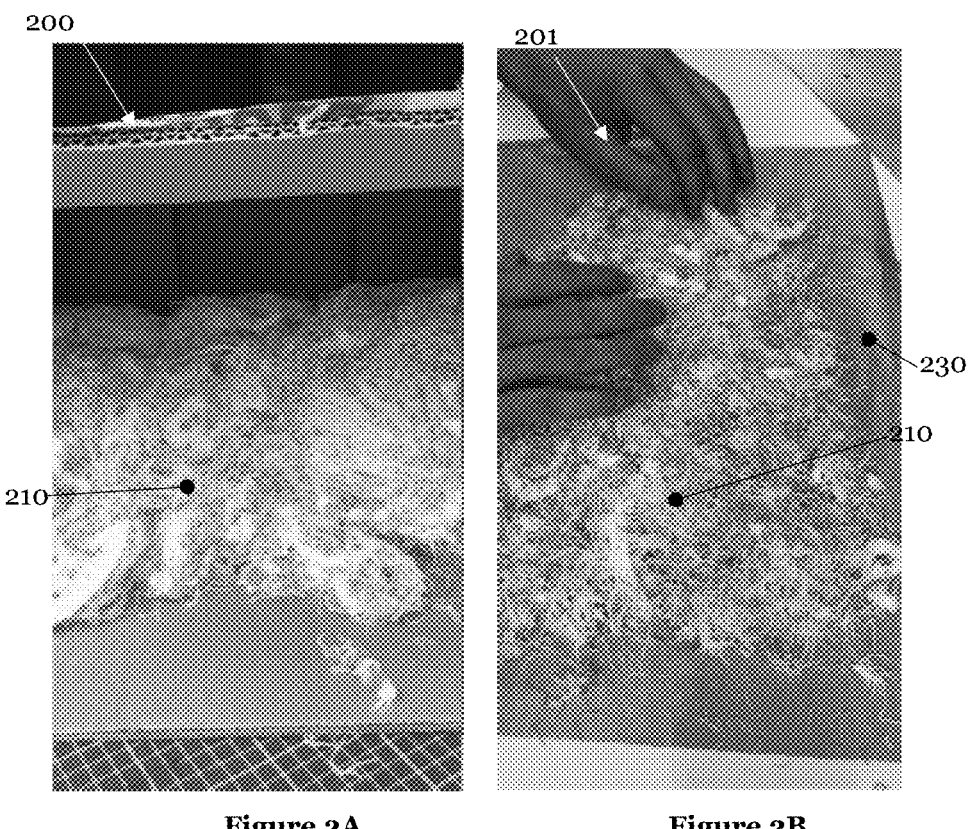
FIGS. 2A-2D show an illustration of an embodiment of manufacturing a component from waste yarns.
Figures 2C, 2D:
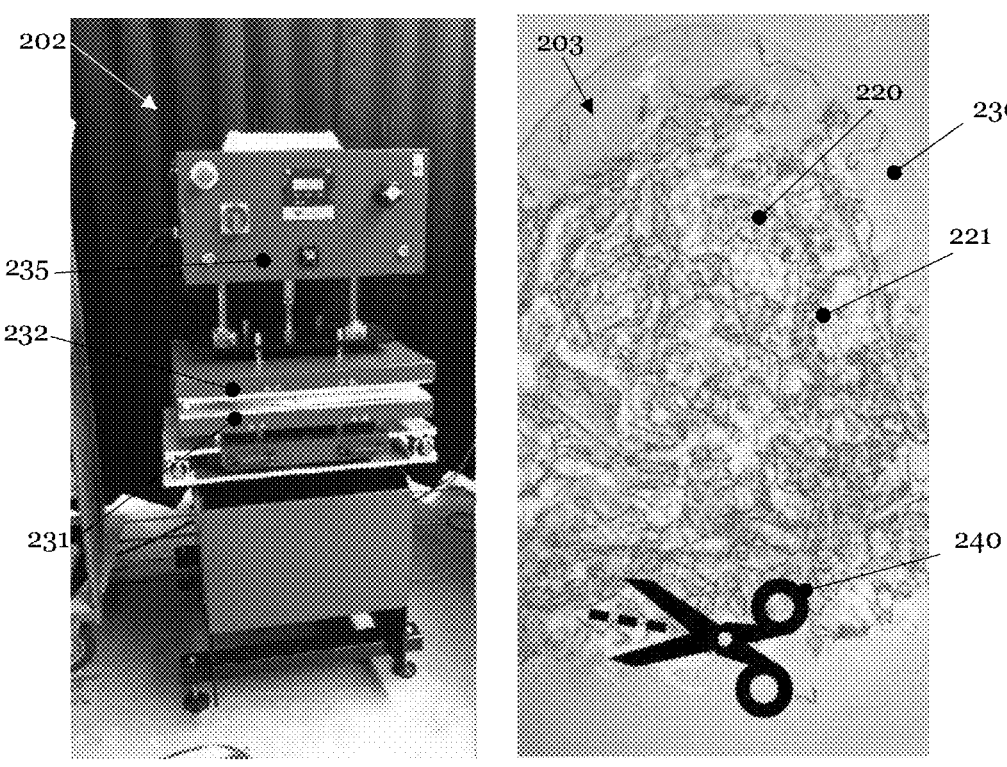

FIGS. 2A to 2D depict an embodiment of a process of manufacturing a component according to the present disclosure. FIG. 2A shows step 200, which depicts waste yarns 210 being collected in a container, which may have been generated during the manufacture of a textile element. These waste yarns 210 are then, at step 201 shown in FIG. 2B, distributed on a first surface 230. The first surface 230 may be a non-sticking foil adapted to be placed in a heat press. At step 202, depicted in FIG. 2C, the first surface 230 is arranged between a first 231 and second 232 heating plate of a heat press 235. After the application of heat and pressure in the heat press 235, the former waste yarns 210 are now bonded together to form a sheet 221 of bonded waste yarns 220, depicted as step 203 in FIG. 2D. The sheet 221 of bonded waste yarns 220 may then be further processed into any desired component by cutting the respective shape out of sheet 221. The cutting may be performed by any known cutting means 240, such as scissors, knife, laser, a cutting die, other automated cutting machines, etc.

Figure 3A:
FIGS. 3A-3E show an illustration of an embodiment of manufacturing an article of footwear partially from waste yarns.
Figure 3B:
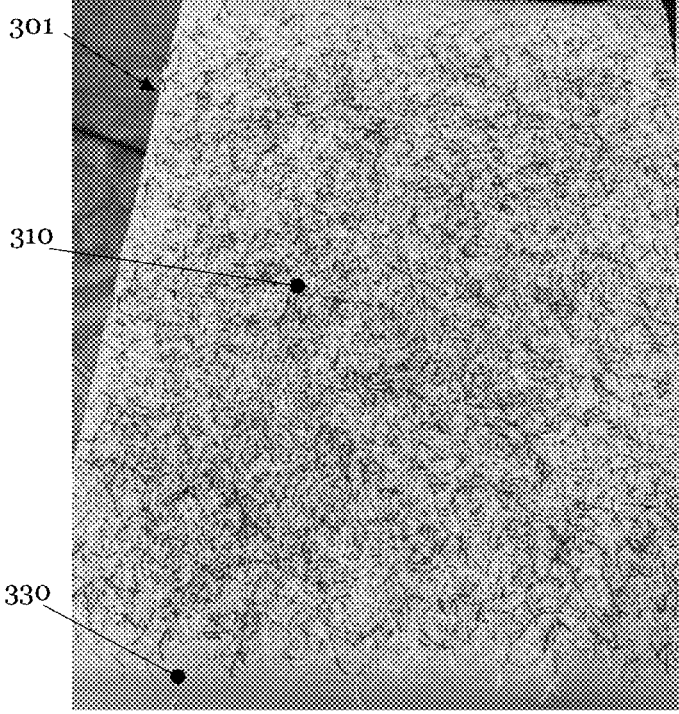

FIGS. 3A to 3E depict another embodiment of a process of manufacturing a component according to the present disclosure. In this embodiment, the component is an upper 360 for an article of footwear, wherein the upper 360 comprises (and in some embodiments almost entirely consists of) bonded waste yarns 320. FIG. 3A shows step 300, which depicts waste yarns 310 being collected in a container 350. Waste yarns 310 may have been generated during the manufacture of a textile element. Moreover, for resulting in a more even yarn distribution and therefore a higher quality of the manufactured component, waste yarns 310 are shortened in length before being placed in container 350. By this, the plurality of waste yarns may all have essentially the same length, wherein a difference of 10% in length is still considered as having essentially the same length. The shortened waste yarns 310 are then, at step 301 shown in FIG. 3B, distributed on a first surface 330. The distributing may be performed by moving container 350 having a plurality of openings on its bottom surface above the first surface 330. The moving may be performed by hand or via a computer-controlled apparatus, such as a robotic arm or an CNC device. The first surface 330 may be a non-sticking foil adapted to be placed in a heat press. Container 350 may comprise a box as described herein.

Figure 3C:
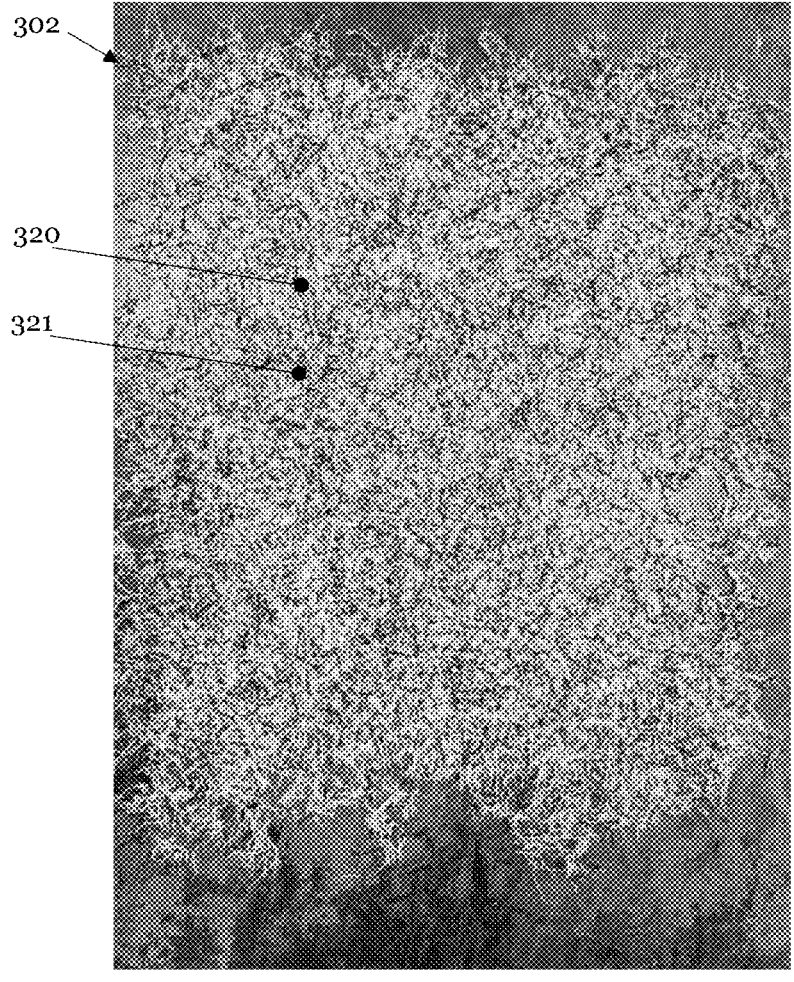
Figure 3D:
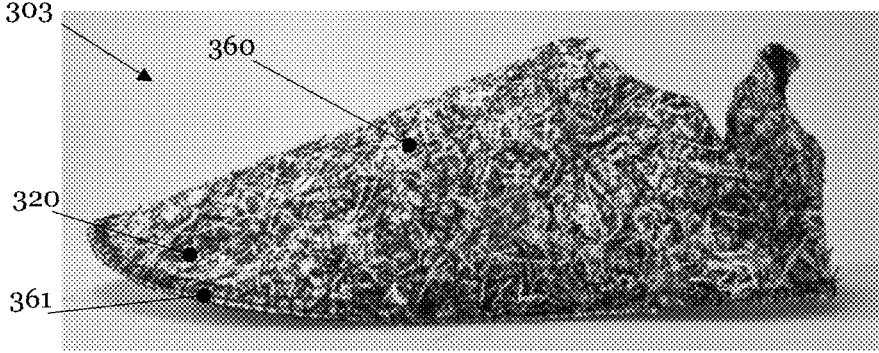
Figure 3E:
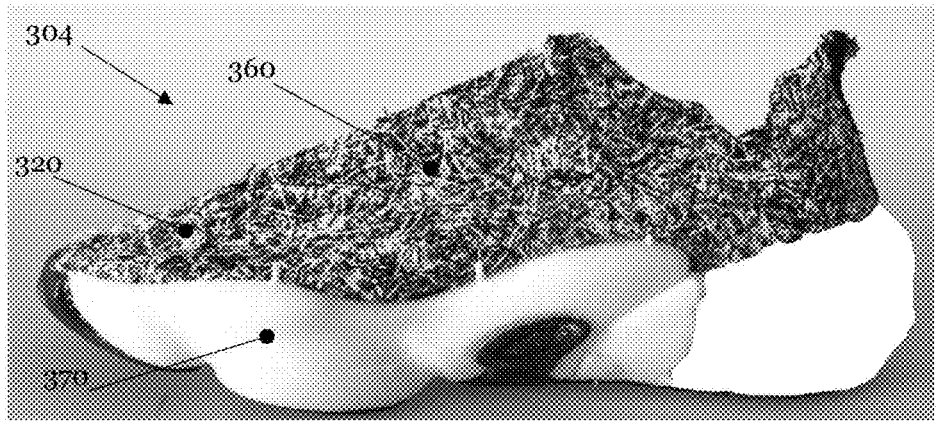

FIG. 3C depicts at step 302 the result of a flat sheet 321 of bonded waste yarns 320 after applying heat and pressure to the distributed waste yarns 310. It may be noted that the processes described herein, which result in a flat sheet of bonded yarns may instead of being generated as individual sheets in a heat press, also be generated in a continuous rolling-process on a conveyor belt, which results in a long band of bonded waste yarns.

The flat sheet 321 of bonded waste yarns 320 may then be cut to a shape for manufacturing an upper 360 and connected to an insole 361, which also may be cut from flat sheet 321. Thus, upper 360, depicted at step 303 in FIG. 3D, including insole 361 comprises (and in some embodiments almost entirely consists of) bonded waste yarns 320. Finally, upper 360 is arranged on a sole 370 and attached thereto, which is depicted at step 304 in FIG. 3E. By this method, waste yarns 310, which in the art may have been thrown on a landfill, are used to manufacture a new component in form of an upper for an article of footwear.

FIGS. 4A to 4E depict multiple embodiments of a box 450, which is adapted for distributing waste yarns 410 evenly on a first surface. All embodiments 400-404 are depicted as nets of a polyhedron, which after an assembling process result in the box 450. Each of the boxes 450 comprises a bottom surface 430, which comprises a plurality of openings 433. Openings 433 may have been cut into bottom surface 430 by means of any suitable cutting means. In some preferred embodiments, a laser may be used to cut openings 433. A pattern of the openings may be adapted based on a required level of even distribution of waste yarns 410 on the first surface, wherein smaller openings may result in a more even distribution than larger openings. The larger openings, however, may reduce a time required for distributing a desired amount of waste yarns 410 on the first surface. Moreover, depending on a diameter of the available waste yarns 410, larger or smaller openings may be preferred. Similarly, depending on whether waste yarns 410 are at least partially mechanically interconnected, for example knitted or woven, which may require larger openings compared to essentially individual waste yarns 410, for which smaller openings may be advantageous. The pattern may generally be adapted to prevent multiple plied waste yarns 410 from being distributed on the first surface.

Figure 4A:
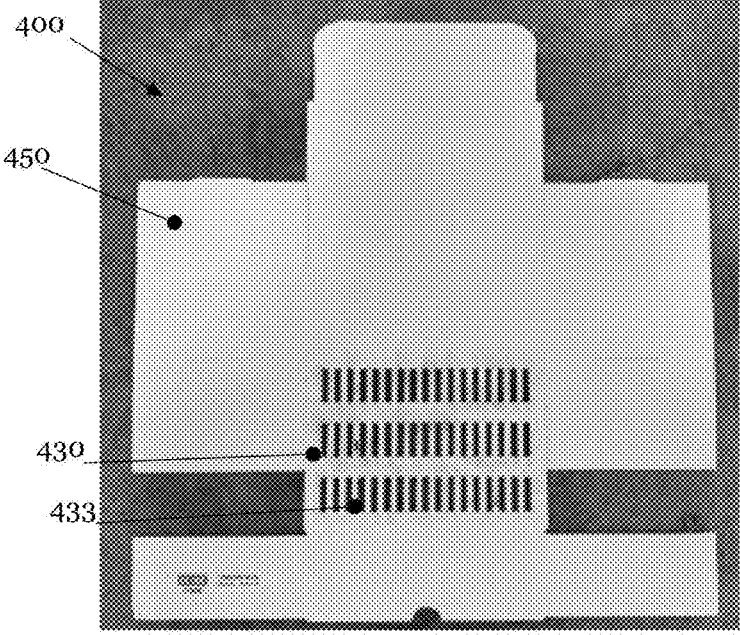
FIGS. 4A-4F show illustrations of various embodiments of a box comprising different opening patterns.
Figure 4B:
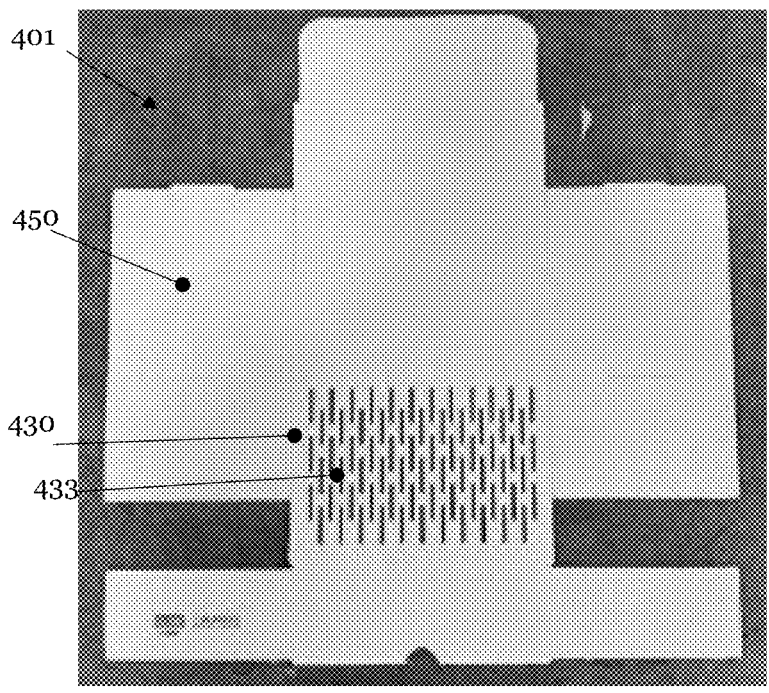
Figure 4C:
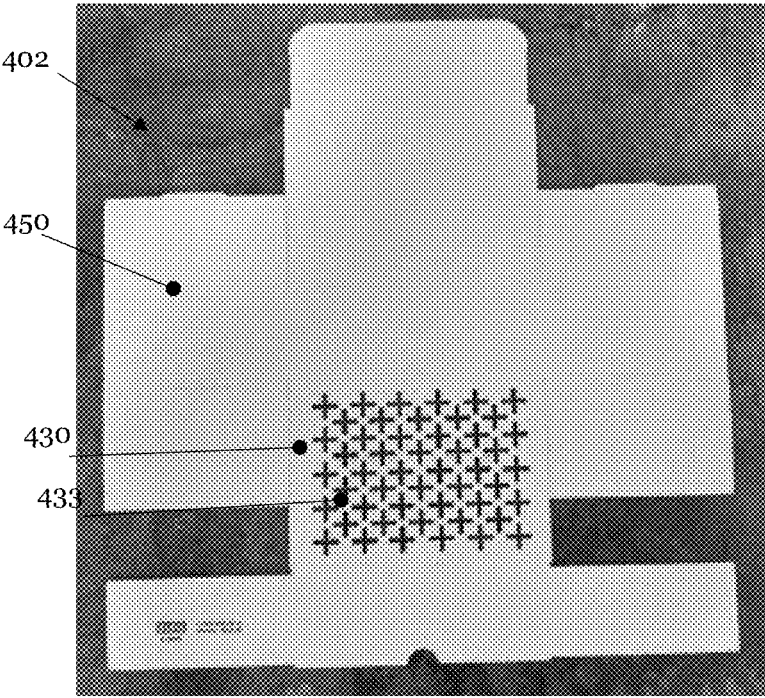
Figure 4D:
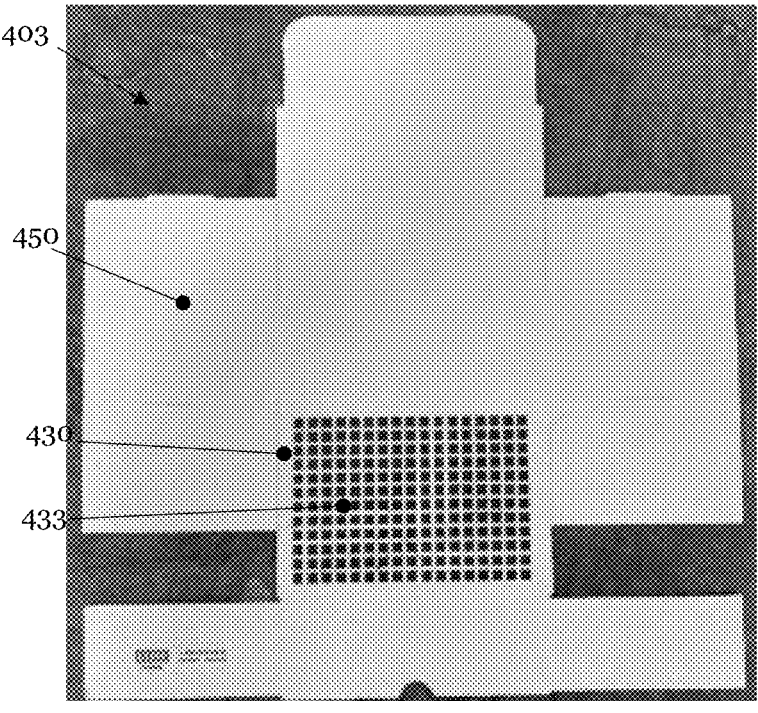
Figure 4E:
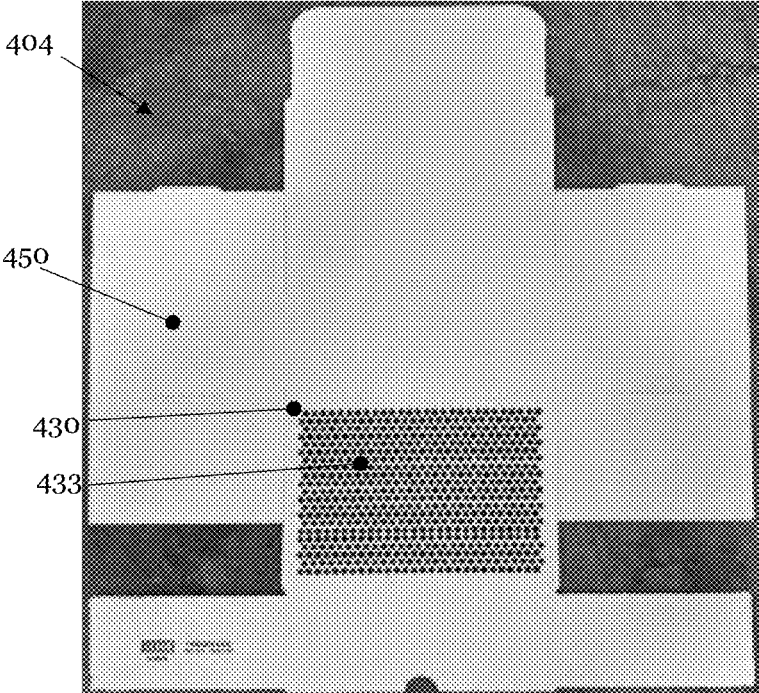

Openings 433 of embodiment 400 of box 450 depicted in FIG. 4A comprise a pattern of rows of small rectangular openings. For example, in some embodiments, openings 433 of embodiment 400 of box 450 depicted in FIG. 4A comprise a pattern of three rows of seventeen small rectangular openings. Openings 433 of embodiment 401 of box 450 depicted in FIG. 4B comprise a pattern of partially overlapping rows of alternating odd and even-numbered small rectangular openings. For example, in some embodiments, openings 433 of embodiment 401 of box 450 depicted in FIG. 4B comprise a pattern of six partially overlapping rows of alternating eleven and twelve small rectangular openings. Openings 433 of embodiment 402 of box 450 depicted in FIG. 4C comprise a pattern of partially overlapping rows of alternating even and odd-numbered cross-shaped openings. For example, in some embodiments, openings 433 of embodiment 402 of box 450 depicted in FIG. 4C comprise a pattern of nine partially overlapping rows of alternating six and five cross-shaped openings. Openings 433 of embodiment 403 of box 450 depicted in FIG. 4D comprise a pattern of rows of square-shaped openings. For example, in some embodiments, openings 433 of embodiment 403 of box 450 depicted in FIG. 4D comprise a pattern of seventeen rows of twelve square-shaped openings. Openings 433 of embodiment 404 of box 450 depicted in FIG. 4E comprise a pattern of rows of circular-shaped openings. For example, in some embodiments, openings 433 of embodiment 404 of box 450 depicted in FIG. 4E comprise a pattern of twenty-eight rows of twenty-one circular-shaped openings.

Figure 4F:
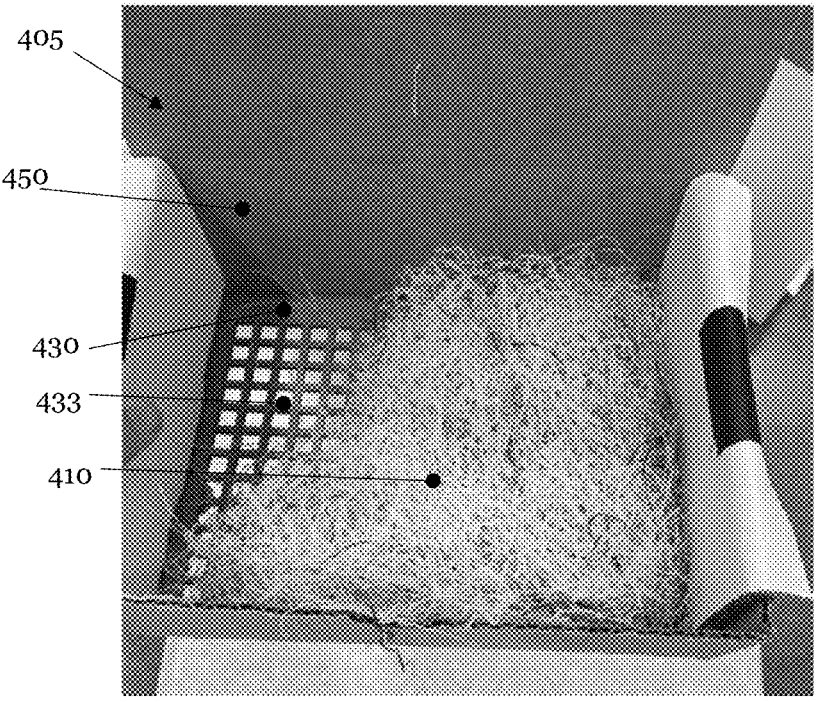

FIG. 4F depicts the embodiment 403 of box 450 in an assembled state. Box 450 therefore comprises a bottom surface 430 having the openings (for example, the square-shaped openings 433) as described above. Moreover, unconsolidated waste yarns 410 are arranged within box 450 such that a movement or shaking of box 450 results in individual or small bunches of waste yarns 410 passing through the openings 433. Prior to arranging the waste yarns 410 in the box 450, the waste yarns may have been mechanically sorted to merely comprise waste yarns up to a specified denier limit. Moreover, the waste yarns may also have been shortened such that no waste yarn 410 has a greater length than an upper length limit, for example 20 cm.

It may be noted that box 450 must be understood as only one embodiment of the second surface, and that other embodiments, such as a plate, may also be in accordance with the present disclosure.

Figure 5A:
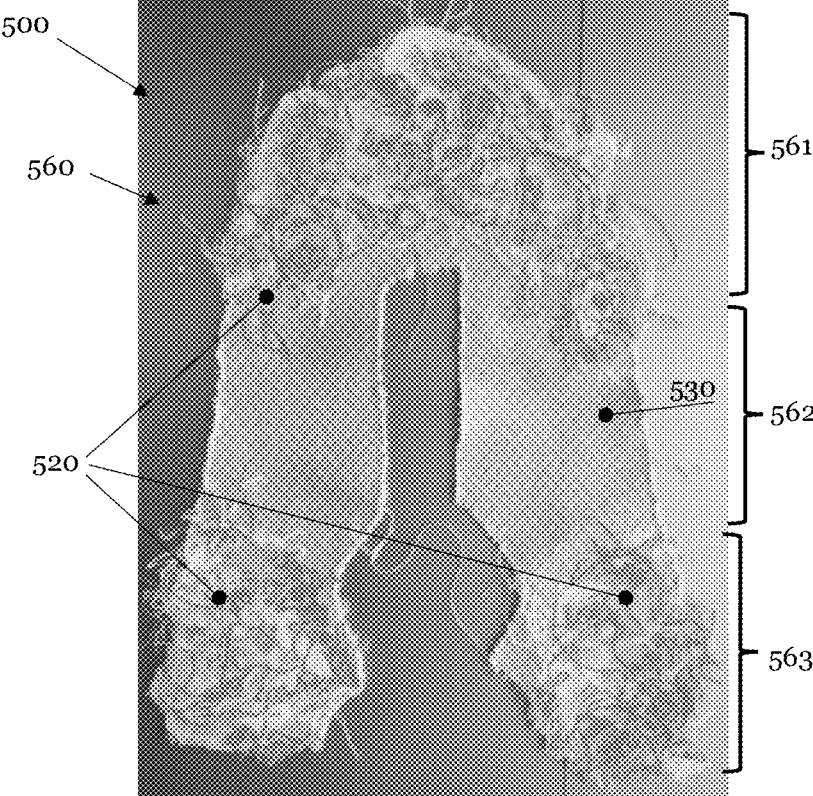
FIGS. 5A-5B show an illustration of an embodiment of waste yarns being distributed on a textile element.
Figure 5B:
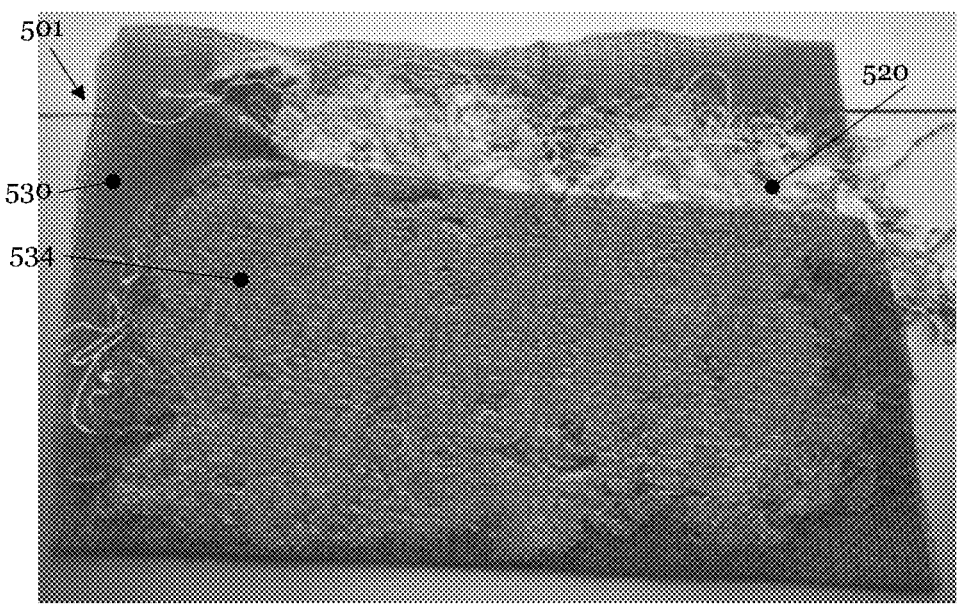

Each of FIGS. 5A and 5B depicts one embodiment of a component 500, 501 in which waste yarns are arranged on a textile element 530. Thus, in these embodiments, the first surface comprises a textile element or at least one textile layer.

FIG. 5A depicts an embodiment of a component 500 having a shape of a textile element 530, which is adapted to be processed into an upper for an article of footwear. Textile element 530 may be divided into a toe cap area 561, a midfoot area 562 and a heel area 563. In embodiment 500, waste yarns have been arranged in the toe area 561 and in the heel area 563. After applying heat and pressure to the distributed waste yarns and the textile element 530, bonded waste yarns 520 are attached to textile element 530. By this, reinforcement of these areas in an assembled upper may be provided to a wearer of an article of footwear comprising the upper based on the bonded waste yarns 520. Moreover, the bonding of waste yarns, which usually have been thrown on a landfill, provides an environmentally friendly process of re-using waste material.

FIG. 5B depicts an embodiment of a component 501 according to the present disclosure in which waste yarns are distributed between a first 530 and second 534 textile element. Textile elements 530 and 534 correspond to a textile layer in form of a net. After applying heat and pressure, the bonded waste yarns 520 are attached to the first 530 and second 534 textile element. In this case, the advantageous as described with respect to embodiment 500 comprising a single textile layer also apply. In addition, the sandwiched arrangement provides a versatile reinforcement textile, which may be attached or arranged in areas of pieces of apparel, article of footwear or sports equipment, which require additional support or stiffening. Alternatively, the sandwich structure may be inverted. By this, one layer of a textile element 530, 534 may be arranged between two layers of waste yarns.

Figure 6A:
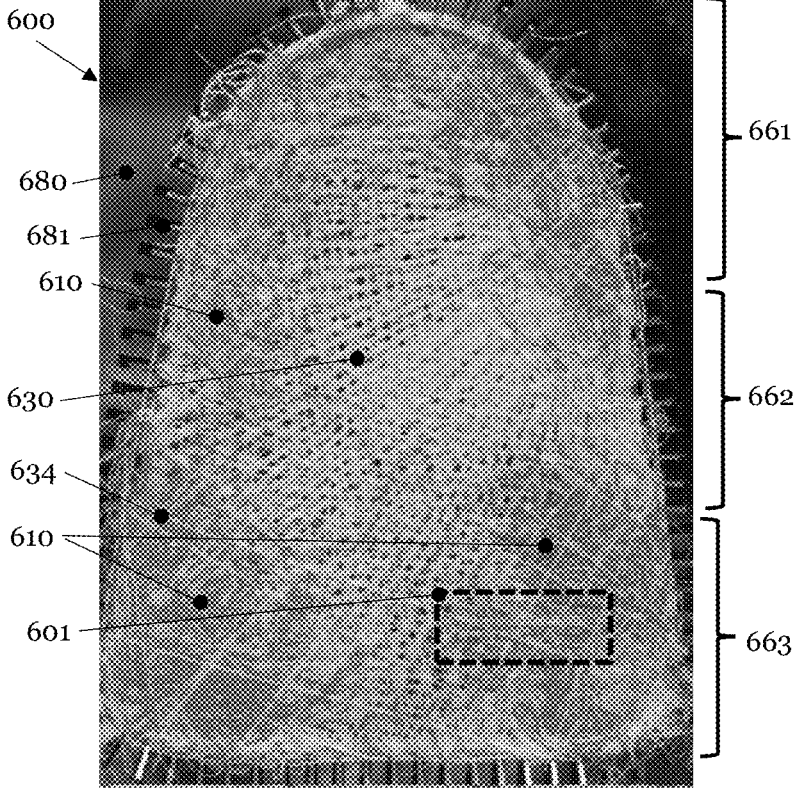
FIGS. 6A-6B show an illustration of an embodiment of waste yarns being distributed between two textile layers.
Figure 6B:
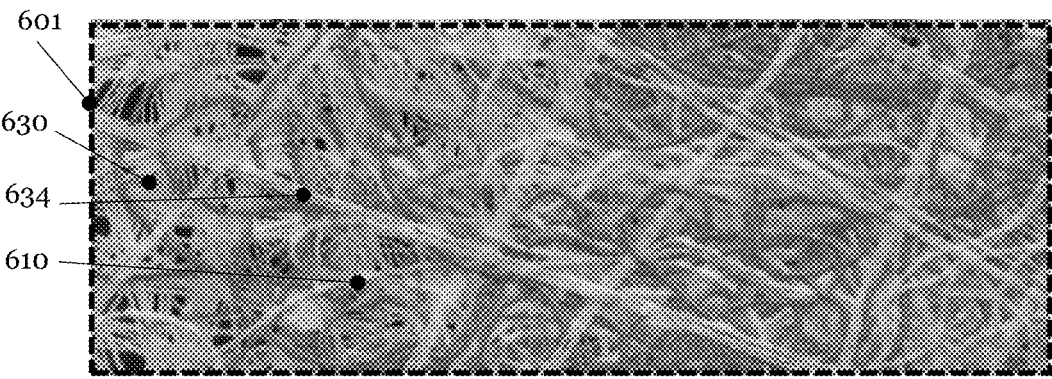

FIG. 6A depicts an embodiment of a component 600 according to the present disclosure. Component 600 is adapted to be processed into an upper 660 for an article of footwear. Thus, component 600 may be divided into a toe cap area 661, a midfoot area 662 and a heel area 663. Component 600 comprises a first textile layer 630, which was manufactured by winding multiple continuous threads around anchor points 681 of frame 680. By this, the first textile layer 630 comprises a pattern of the continuous threads, which was neither knitted nor woven. On top of the first textile layer 630, waste yarns 610 are distributed in the toe cap area 661 and the heel area 663 at least partially. As depicted in FIG. 6a, a density of the distributed waste yarns 610 is higher in the heel area 663 compared to the toe cap area 661, wherein the density of the distributed waste yarns 610 is the smallest or essentially zero in the midfoot area 662. Moreover, to secure the distributed waste yarns 610 prior to a bonding process, a second textile layer 634 has been arranged on top of the distributed waste yarns. The second textile layer 634 was also manufactured by winding at least one continuous thread around the anchor points 681 of frame 680. By this, waste yarns 610 are sandwiched between the first 630 and second 634 textile layer, which is also depicted in FIG. 6B showing the area 601 of FIG. 6A in an enlarged view. The sandwiched arrangement of the first textile layer 630, the waste yarns 610 and the second textile layer 634 may be further processed in a heat press, cut out of the frame 680 and assembled to an upper of an article of footwear having a reinforced toe box and heel counter. This demonstrates another beneficial embodiment of re-using waste yarns according to the present disclosure.

It may be noted that other distributions of the waste yarns 610 are also possible. For example, the waste yarns may be distributed evenly across the entire first textile layer 630 for efficiently increasing the thickness of the first textile layer. By this, a time required for winding the threads around anchor points 681 to result in a desired thickness or height of the component 600 may be immensely reduced by arranging waste yarns 610 in between two wound textile layers.

It may be further noted that the present application is not limited to sandwich structures having exactly three layers. Thus, sandwich structures comprising more than three layers, such as four, five, six, or more layers as also applicable according to the present disclosure. In these embodiments, an alternating arrangement of a textile layer and a layer of distributed waste yarns may be advantageous. For example, component 501 of FIG. 5 and/or component 600 as depicted in FIG. 6A may comprise an additional layer of distributed waste yarns arranged on top of the second textile layer 534, 634.

Figure 6C:
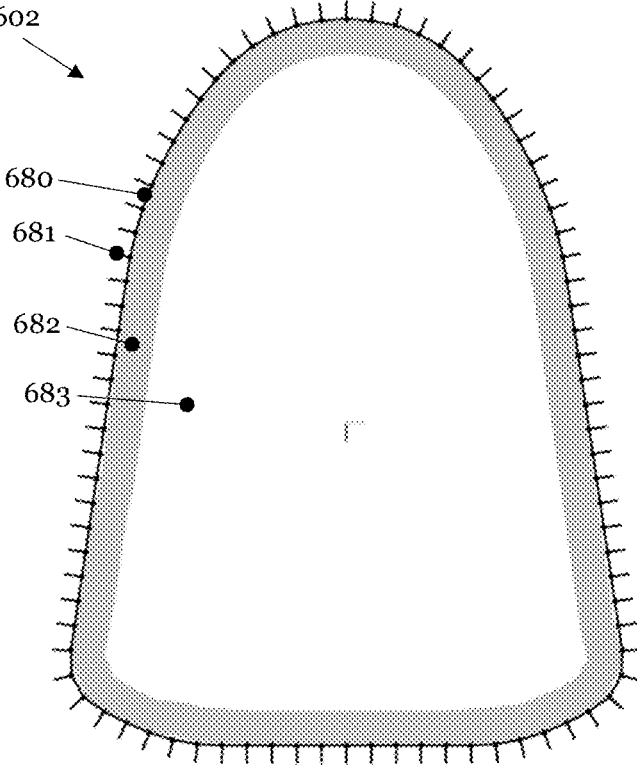
FIG. 6C shows an illustration of an embodiment of a frame comprising a plurality of anchor points.

FIG. 6C depicts an embodiment 602 of a frame 680 similar to the frame shown in FIG. 6A, which is adapted for manufacturing an upper for an article of footwear. Frame 680 comprises a plurality of anchor points 681, around which continuous threads may be wound for forming a pattern of a textile element. Generally, the wound pattern must be separated from the frame 680, which may be performed after consolidating or heat-pressing the inner portion 683 of the wound pattern. After the consolidating, the inner portion 683 may be cut or punched out of frame 680, which leaves the outer part 682 in form of unconsolidated waste yarns, which could be processed according to the methods described herein.

Figure 6D:
FIG. 6D shows an illustration of an embodiment of an article of footwear comprising waste yarns.

FIG. 6D depicts an article of footwear 603 comprising a component according to the present disclosure. Footwear 603 comprises a sole 670 and an upper 660. Upper 660 comprises a textile layer 630, which has been manufactured by the winding of threads around anchor points, as described above. Moreover, for reinforcing a collar area of upper 660, waste yarns have been arranged on the textile layer 630 in the collar area and bonded to the upper 660. Thus, upper 660 comprises bonded waste yarns 620 in form of a reinforcing top layer in the collar area.

Figures 6E, 6F:
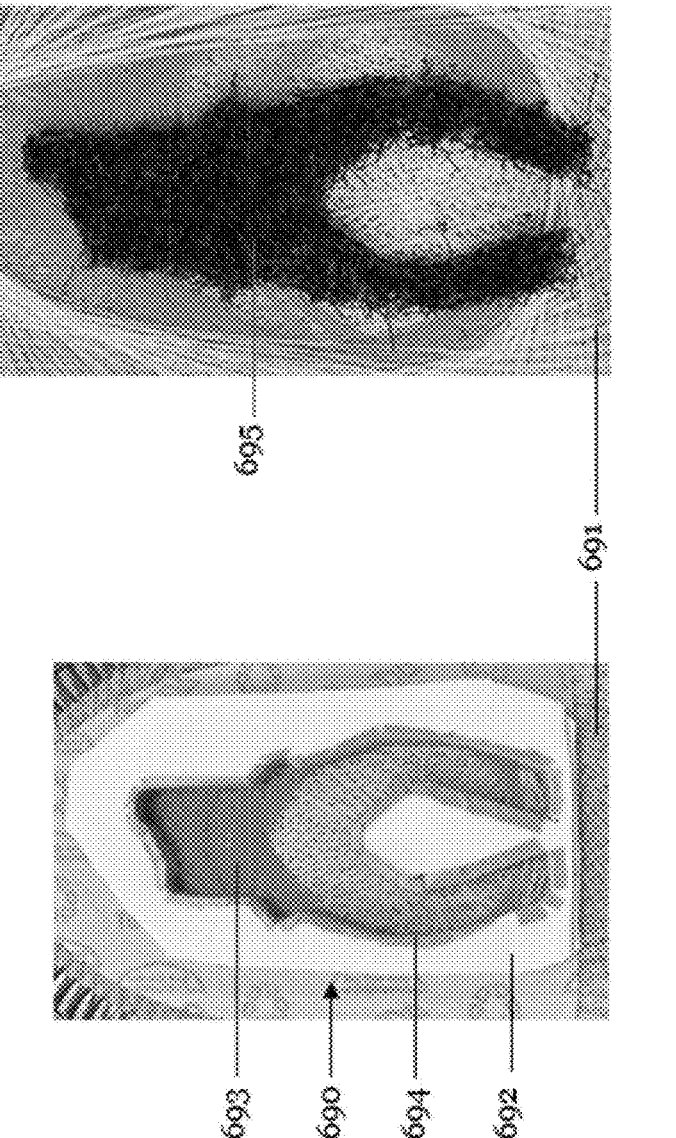
FIG. 6E shows an illustration of an embodiment of a jig used to arrange waste yarns in an intended region of a textile element.
FIG. 6F shows an illustration of the textile element as per FIG. 6E with waste yarns arranged in the intended region.

In some embodiments, the waste yarns may be arranged in the desired collar area by using a jig, which is arranged on top of the textile layer 630 during the arrangement/distributing of waste yarns. Such a jig covers regions outside of the collar region such that no waste yarns may be distributed in the covered regions. Further, the jig exposes the collar region such that waste yarns may be distributed exclusively in the collar region. FIG. 6E shows an example of a jig 690 laid down on another textile element 691, which is intended to form a part of an upper of an article of footwear. The textile element 691 has been manufactured by the winding of threads around anchor points, as described above. The jig 690 covers a first region 692 of the textile element 691. The jig 690 comprises an opening 694, which exposes a second region 693 of the textile element 691. As can be seen from FIG. 6F, waste yarns 695 had been inserted into the opening 694 of the jig 690. In the shown example, the opening 694 had been filled completely by the waste yarns 695. By this, the resulting textile element 691 is covered by waste yarns 695 in the shape of the opening 694 of the jig. Subsequently, the waste yarns 695 may be consolidated.

In general, an exemplary method of manufacturing a textile element, for example the component 600 described above, may comprise the following steps. First, the method may comprise defining a plurality of peripheral anchor points. The method may further comprise the step of winding a continuous thread around the plurality of peripheral anchor points to form a thread pattern. The continuous thread may comprise a plurality of thread lines with each thread line extending between two respective peripheral anchor points. The method may further comprise the step of bonding the continuous thread at a point of intersection between the thread lines. The bonding may be limited to a central region, or the bonding may exclude an edge region of the thread pattern. The method may further comprise the step of separating the bonded thread pattern from the peripheral anchor points. The separating may generate waste yarns. The waste yarns may originate from a bonded region or a non-bonded region of the thread pattern. The method may further comprise the step of distributing the waste yarns on the bonded thread pattern. Thus, the waste yarns may be arranged on the same thread pattern, from which they have been separated. The method may further comprise the step of bonding at least a part of the distributed waste yarns to each other and/or to the bonded thread pattern. In other words, the method of manufacturing a component as described herein may be combined with a known process of winding a thread or yarn around anchor points. This may result in a textile element having the advantages of a component as described herein, wherein additionally zero waste yarns may be generated during the manufacturing of the textile element.

Figure 7A:
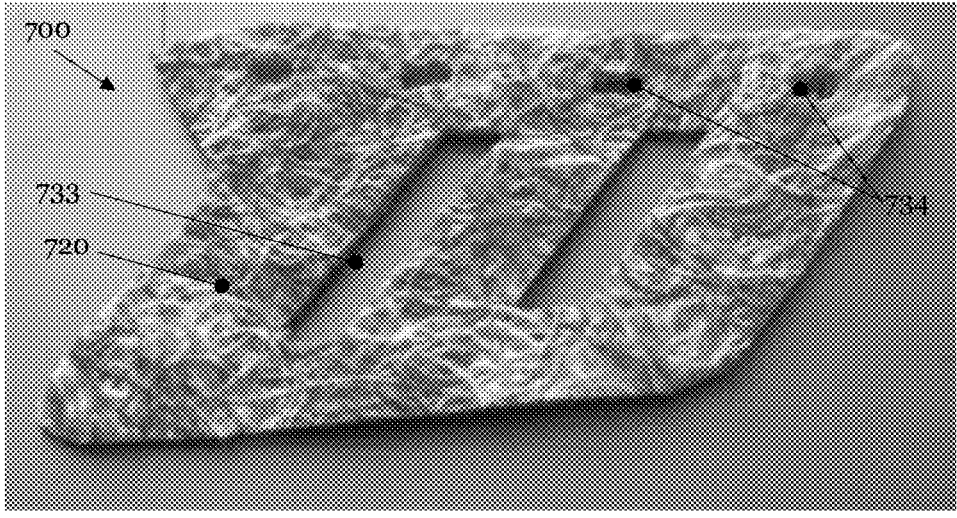
FIGS. 7A-7C show illustrations of embodiments of components comprising waste yarns molded in different shapes.
Figure 7B:
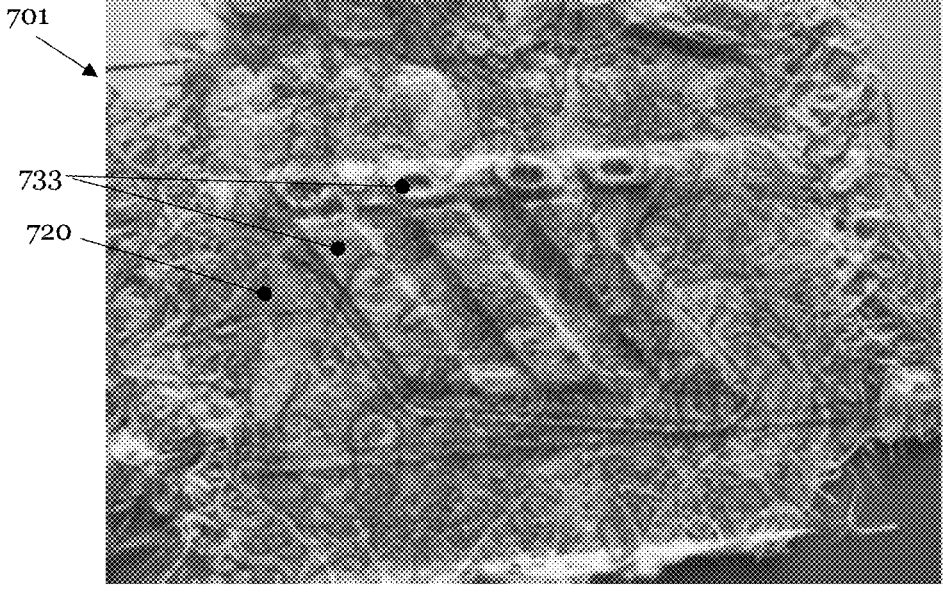
Figure 7C:
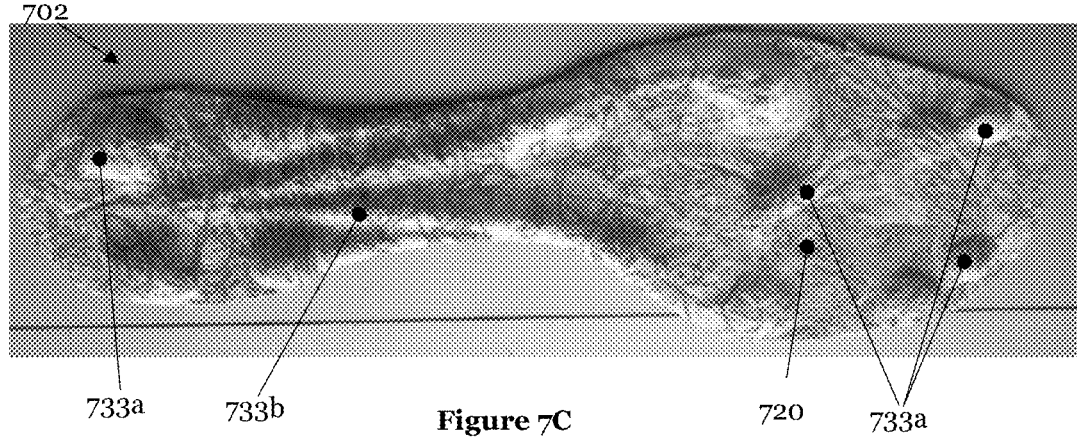

FIGS. 7A to 7C depict embodiments of components 700, 701, and 702 according to the present disclosure. For manufacturing the components 700, 701, and 702, waste yarn was placed inside a mold, and particularly on a bottom surface of the mold. Similar to the heat-pressing described above, the mold also applies heat and pressure to the distributed waste yarns, but also presses the waste yarns into a desired shape.

For example, component 700 as depicted in FIG. 7A comprises (and in some embodiments consists entirely of) bonded waste yarns 720, which are molded into a flat reinforcing component 700. Component 700 may be utilized for reinforcing portions of an upper. Component 700 comprises four eyelets 734 and two openings 733 for improved ventilation of a corresponding upper, which comprises component 700.

Component 701 as shown in FIG. 7B depicts an embodiment, which like component 700 comprises (and in some embodiments is entirely made of) bonded waste yarns 720. Component 701 further comprises a surface structures 733. Thus, during the consolidation of component 701 surface structures are pressed into component 701. These surface structures must be understood as merely demonstrating an embodiment of a molded component having a structured surface according to the present disclosure. In general, any shapes and forms can be manufactured by molding waste yarns 720 in a mold. The variation in local thickness introduced by the surface structures may be utilized for modifying stiffness and bending characteristics of a component.

FIG. 7C depicts another embodiment of a component 702 according to the present disclosure. Component 702 comprises surface structures 733a and 733b and comprises (and in some embodiments is entirely made from) bonded waste yarns 720. Component 702 further has a shape of a sole for an article of footwear. In particular, component 702 may be especially advantageous for cleated articles of footwear. For that, component 702 comprises various surface structures 733a, which are at least partially arranged at locations, at which cleats are attached in the finished footwear. Thus, surface structures 733a provide additional stiffness to those areas, which are exposed to increased pressure based on the attached cleats when worn by a user. In addition, component 702 further comprises additional surface structures 733b, which are adapted to provide increased bending stiffness to a sole, which comprises component 702.

Figure 8:
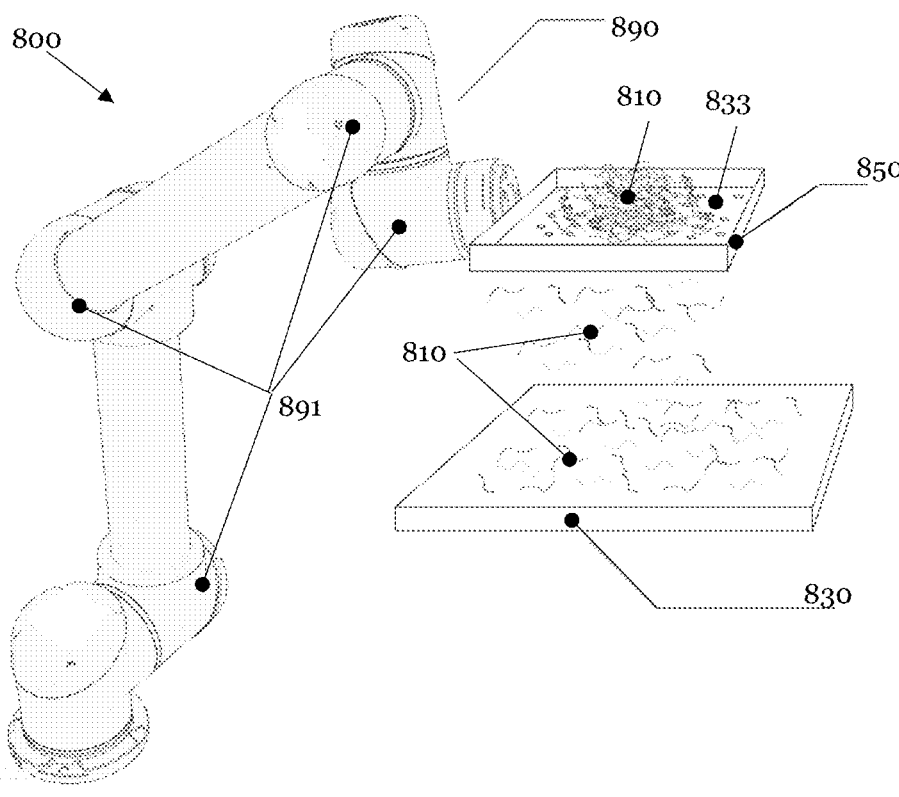
FIG. 8 shows an illustration of an embodiment of a robotic arm distributing waste yarns on a first surface.

FIG. 8 depicts an embodiment 800 of a method of manufacturing a component according to the present disclosure by utilizing a robotic arm 890. A plate 850 is attached at an end of robotic arm 890. The plate 850 comprises a plurality of openings 833, which may correspond to one of the openings discussed above with respect to FIGS. 4A to 4F. On a bottom surface of plate 850, shortened or cut waste yarns 810 are arranged. Moreover, a first surface 830 is arranged below plate 850, which may be a surface adapted to be placed inside a heat press or a tray of the heat press. Robotic arm 890 further comprises a plurality of joints 891, which may be configured to move plate 850 in a predetermined pattern. The movement may be adjusted such that small bunches of waste yarns 810 or preferably even only individual waste yarns 810 are evenly distributed on the first surface 830. By utilizing robotic arm 800 or another computer-controlled device such as a CNC device, an even distribution of waste yarns 810 on the first surface 830 may be provided, which enables to result in a flat sheet of bonded waste yarns with an essentially constant thickness and yarns density after a consolidation processing.

Figure 9:
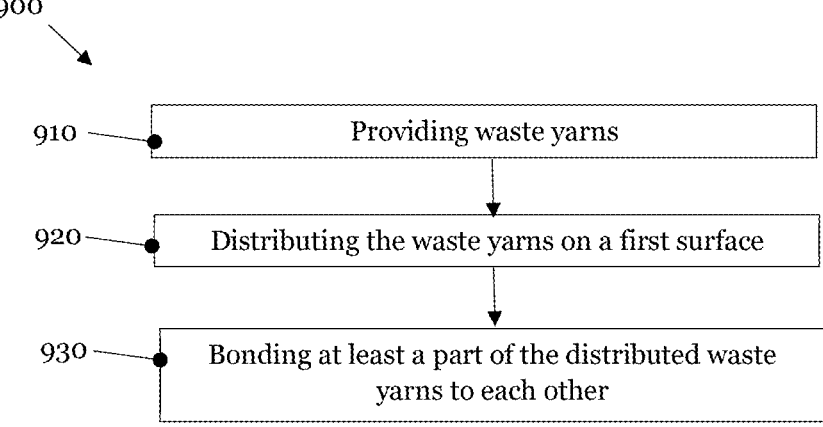
FIG. 9 shows a block diagram of an embodiment of a method of manufacturing a component from waste yarns.

FIG. 9 depicts an embodiment of a method 900 for manufacturing a component according to the present disclosure. The method comprises the step of providing 910 waste yarns as described above. The method further comprises the step of distributing 920 the waste yarns on a first surface as described above. The method further comprises the step of bonding 930 at least a part of the distributed waste yarns to each other as described above.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but can be interchanged to meet various situations as would be appreciated by one of skill in the art.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A method of manufacturing a component at least partially from waste yarns, the method comprising:
   (a) providing waste yarns;
   (b) arranging a jig on a first textile element such that the jig covers a first region of the first textile element, wherein the jig comprises an opening exposing a second region of the first textile element;
   (c) distributing the waste yarns through the opening of the jig on the second region of the first textile element; and (d) bonding at least a part of the distributed waste yarns to each other.

2. The method of claim 1, wherein the waste yarns comprise at least a thermoplastic polymer material.

3. The method of claim 1, wherein at least 70% of the waste yarns comprise unconsolidated waste yarns.

4. The method of claim 1, wherein the waste yarns comprise consolidated waste yarns.

5. The method of claim 1, wherein the bonding comprises applying heat and pressure to the distributed waste yarns.

6. The method of claim 1, wherein the waste yarns comprise leftover yarns.

7. The method of claim 1, further comprising separating the waste yarns from a textile element prior to providing the waste yarns.

8. The method of claim 7, wherein the textile element was manufactured by winding a thread or yarn around a plurality of anchor points.

9. The method of claim 1, further comprising mechanically sorting the waste yarns by length, denier, or density, and/or shortening a length of the waste yarns, prior to distributing the waste yarns.

10. The method of claim 1, further comprising arranging the waste yarns on a movable second surface having a plurality of openings, wherein the distributing further comprises moving the movable second surface above the first textile element such that the waste yarns pass through the plurality of openings onto the first textile element.

11. The method of claim 10, wherein the movable second surface is attached to a device, and the method further comprises controlling a movement pattern of the device based on at least one actuator.

12. The method of claim 1, wherein the distributing comprises distributing the waste yarns evenly on the second region of the first textile element.

13. The method of claim 1, wherein the distributing comprises distributing the waste yarns on a first area of the first textile element such that a first density of the distributed waste yarns is generated in the first area and distributing the waste yarns on a second area of the first textile element such that a second density of the distributed waste yarns is generated in the second area, and wherein the second density is smaller than the first density.

14. The method of claim 1, wherein the bonding comprises creating a sheet material.

15. The method of claim 14, further comprising cutting at least a portion of the sheet material into a shape of the component.

16. The method of claim 15, wherein the component is at least a part of one of: an upper for an article of footwear, an article of apparel, or a sports equipment article.

17. The method of claim 1, wherein the first textile element comprises at least one layer of yarns arranged in a pattern.

18. The method of claim 1, further comprising arranging at least a second textile element on the distributed waste yarn prior to the bonding.

19. The method of claim 18, wherein the second textile element comprises at least one layer of yarns arranged in a pattern.

20. The method of claim 1, wherein the bonding comprises molding the waste yarns in a mold to form the component.

21. The method of claim 1, wherein the component is at least a part of: a heel counter, an insole board, a stiffening element, a midfoot component, or an outsole component.

22. The method of claim 1, wherein the component comprises at least 50% by weight of the waste yarns.

23. The method of claim 1, wherein the first textile element comprises an upper for an article of footwear.

24. The method of claim 23, wherein the second region corresponds to a collar region of the upper.

* * * * *